May 6, 1930. F. X. LAUTERBUR ET AL 1,757,124
SPEED CONTROLLING DEVICE
Filed Nov. 1, 1928 4 Sheets-Sheet 1
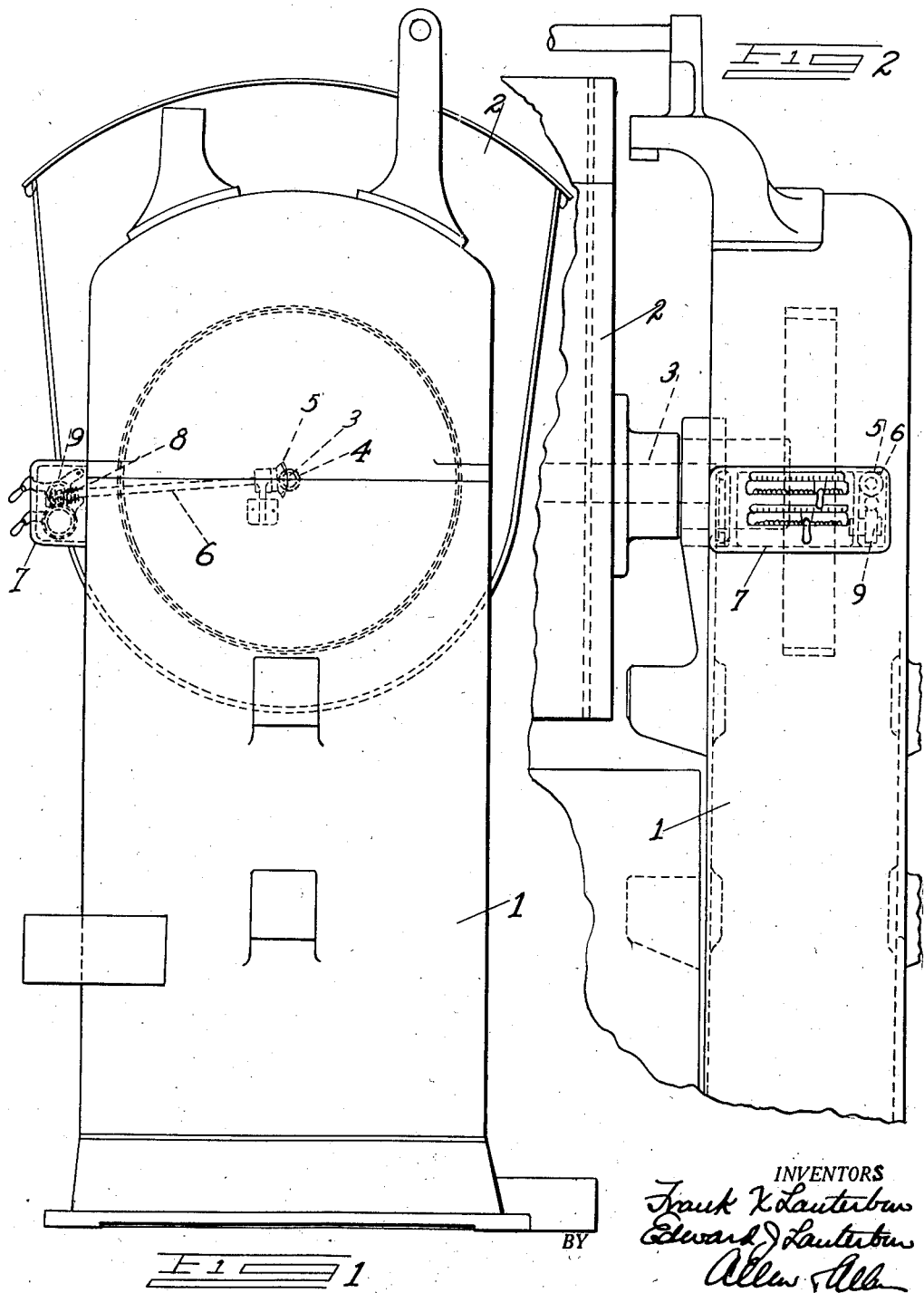
INVENTORS
Frank X. Lauterbur
Edward J. Lauterbur
BY Allen & Allen
ATTORNEYS

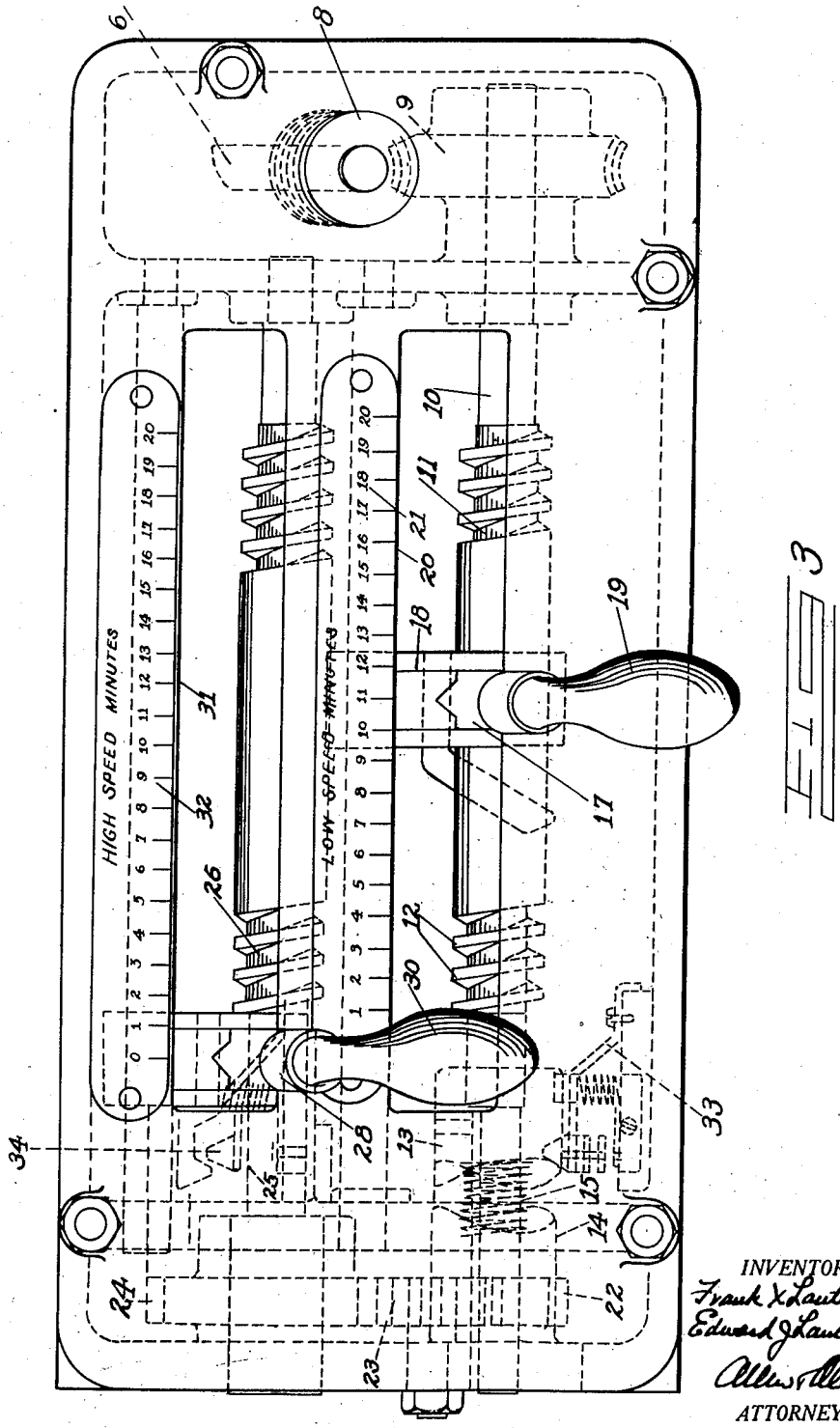

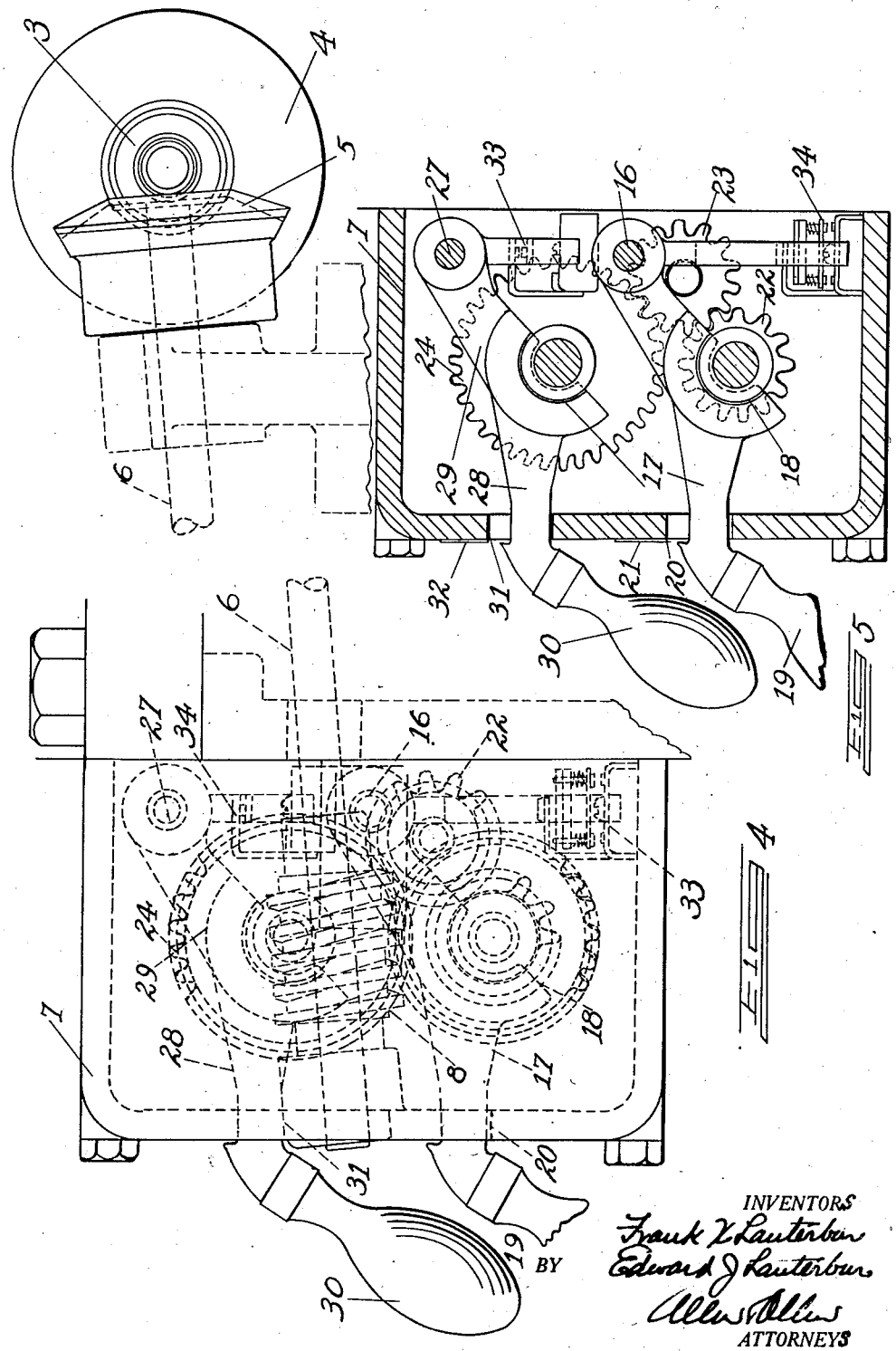

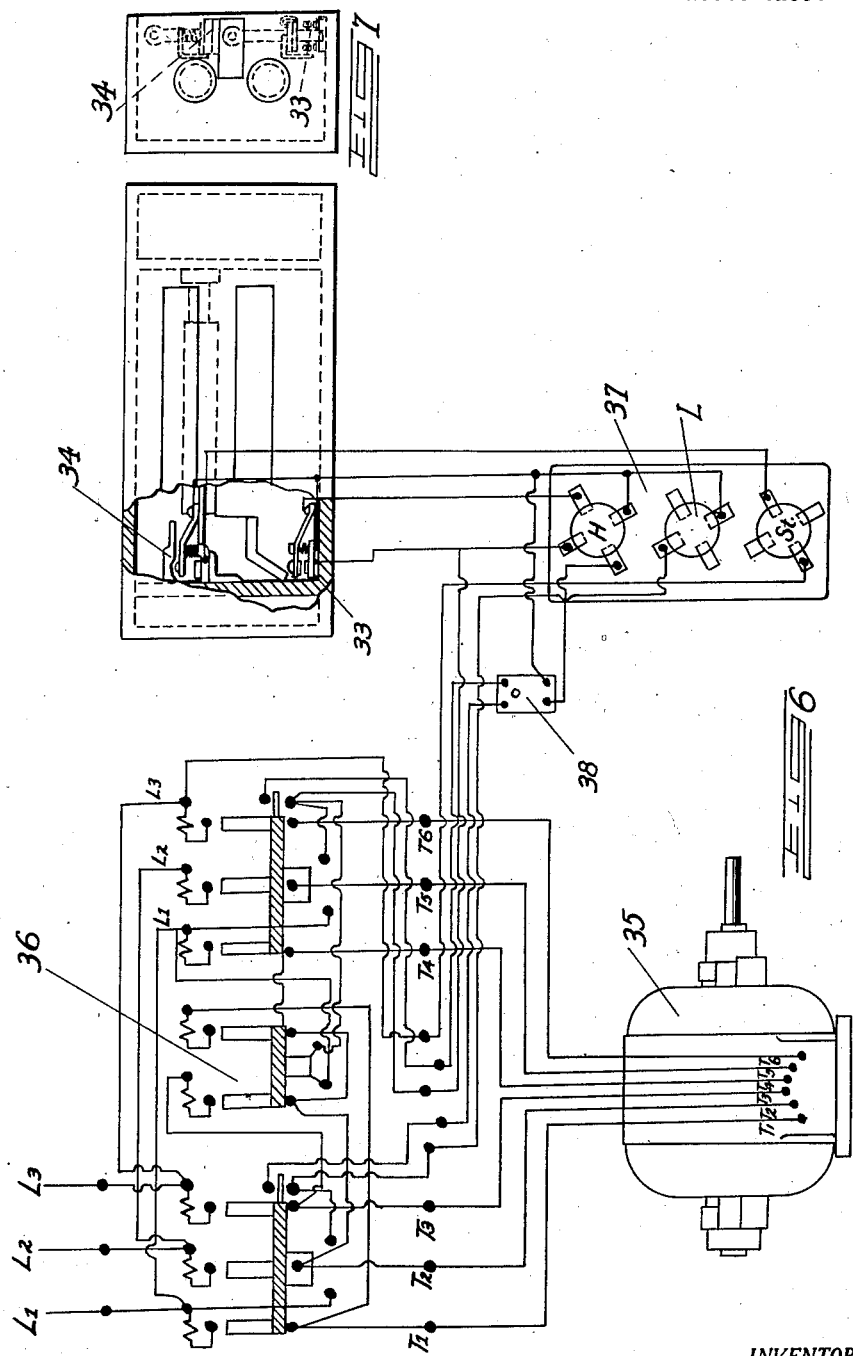

Patented May 6, 1930

1,757,124

UNITED STATES PATENT OFFICE

FRANK X. LAUTERBUR AND EDWARD J. LAUTERBUR, OF SIDNEY, OHIO

SPEED-CONTROLLING DEVICE

Application filed November 1, 1928. Serial No. 316,592.

Our invention relates to speed controlling devices, particularly for mixing machines, and to a novel control which may be so set that a machine will operate for a certain period at one speed, then automatically change the rate of operation for a definite period at a different speed, and then come to a stop.

It is the object of our invention to provide for a plural speed motor, speed change controlling apparatus which an operator may set and which will then govern the interval during which a machine will operate at one speed, and with connections affected by the mechanism controlling the initial interval of operation, which will automatically set in operation another control which will govern the further operation of the machine for another interval at a different speed.

It is one of our specific objects to provide in our controlling mechanism a plurality of screws preferably driven by suitable connections with the driving mechanism for the machine being operated, which screws are engaged by half nuts or other suitable devices carried on levers, and with the number of threads on the screws indicating the intervals during which the several controls will be effective.

The above and other objects to which reference will be made in the ensuing disclosure we accomplish by that certain combination and arrangement of parts which, for purposes of illustration, we have shown incorporated in a dough mixer.

Referring to the drawings:—

Figure 1 is a side elevation of a dough mixer showing one suitable position in which the speed control may be mounted.

Figure 2 is a fragmentary front elevation showing a similar mounting arrangement to that shown in Figure 1.

Figure 3 is a front elevation of the speed control casing.

Figure 4 is a side elevation of the speed control casing.

Figure 5 is a sectional view taken along the lines 5—5 in Figure 3.

Figure 6 is a diagram of a suitable wiring arrangement for the two speed motor which actuates the machine.

Figure 7 is a fragmentary side elevation.

We have indicated a standard or frame 1 in which a mixing bowl 2 is mounted within which an agitator (not shown) is mounted on a supporting shaft 3. The driving connections for the agitator are not shown as they form no part of our invention. Secured to the end of the shaft 3 is a bevel pinion 4 which meshes with another bevel gear 5 mounted on the shaft 6 which extends at right angles to the shaft 3. The shaft 6 extends into the control mechanism casing 7 and there is mounted on its end a worm 8 which drives worm wheel 9. The worm wheel 9 is mounted on the shaft 10 part of screw 11 having spaced threads 12. The screw 11 extends through the casing and on its other end there is idly mounted a clutch pinion 14. A sliding clutch 13 is mounted in axial alignment with the clutch pinion 14, and a spring 15 normally holds the clutches out of engagement.

Parallel with and behind the screw shaft 10 we have provided a stationary guide shaft 16 on which is pivotally and slidably mounted a lever 17 carrying a half nut 18. The handle 19 of the lever 17 extends through a slot 20 in the casing and is thus accessible for properly positioning the half nut. Directly above the slot we have indicated a graduated scale 21, which may be graduated in minutes of operation.

The clutch 14 is operatively connected to a gear 22 which meshes with an intermediate gear 23 which engages and drives a gear 24 mounted on the shaft 25 of another screw 26. The screw 26 has a stationary guide shaft 27 similar to the shaft 16 and a lever 28 is pivotally and slidably mounted on the guide shaft. The lever carries the half nut 29 and has a handle 30 which extends down through an opening 31 in the casing adjacent which there is a graduated scale 32 graduated in terms of minutes operation.

On the lower wall of the casing we have mounted the switch 33 which is a double switch, one set of contacts controlling the circuit to the high speed winding of the motor and normally open, and another set of contacts normally closed for passing the energizing current to the low speed coils of the starter to keep the motor in low speed operation. The normal position of both switches is changed by contact with the half nut or other associated mechanism before the limit of its movement, thereby changing the speed of the machine from low to high or from one speed to another. Near the top wall of the casing we have disposed another switch 34 which is single pole normally closed, but which is opened by the half nut 29 or associated mechanism near its inner limit of movement, and which shuts off the motor.

After the proper settings have been made, it will be observed that both the switches 33 and 34 are operated by the mechanical controlling mechanism. In the wiring diagram, which will now be described, we have further incoporated a three-button switch control which may be used to change the speed of operation of the driving motor or shut it down. The use of a three-button starting control switch with suitable wiring is old and well known in the art, so that any novelty which exists in the three-button switch control lies in its combination with the mechanical control rather than in this control per se.

The two speed driving motor for the mixer is indicated at 35 with a six wire electric circuit to the motor starter 36, and a five wire control circuit to the push button station and that in turn by a four wire circuit to our automatic control. The circuit, as will be observed, includes the three-button station 37, the switches 33 and 34, and a cut-off double pole switch 38. The circuits are indicated with the letters T and L, with appropriate ordinals added so that the wiring may be easily followed. The push button station has the push buttons lettered H for the high speed control. This is a double throw button of the one circuit normally open—one normally closed type, L for the low speed single pole normally open control, and S*t* for the stopping single pole normally closed control.

While in the particular embodiment illustrated the control is so arranged that the mixer is first driven for a certain interval at low speed followed by an increase in the speed for a later interval, it will be quite obvious that the relative speeds at which the machine is operated may be reversed merely by a change in the gear ratio. It will further be obvious that more than two speeds may be regulated by inserting further screw and half nut units.

The operation of the automatic indicating, timing and stopping device is as follows: The lower indicating lever is set on the lower scale at that position which corresponds to the number of minutes it is required to run the machine at low speed, and the upper lever is set at that position which corresponds to the number of minutes it is required to run the machine at high speed. The low or first speed push button is then pushed and the machine and low speed screw begins to rotate, moving the half nut to the left as indicated. When the half nut reaches zero on the scale it rides off the threads on the shaft and the clutches engage, the high speed switch is closed, and the upper screw begins to rotate. During the rotation of the high speed screw the half nut engaging it is moved to the left until it opens the stop switch and shuts off the motor.

While we have indicated graduated scales for indicating the proper setting, in the embodiment illustrated each screw thread indicates one minute of operation. It is obvious that the commonest laborer will know enough to count the number of threads at which he sets the half nuts. We therefore wish to claim this latter idea broadly in which the number of threads on the screws may be used as indicators independently of the graduated scales.

Having thus described our invention, what we claim as new and desire to secure by Letters Patent, is:—

1. Mechanical means for automatically controlling a plural speed electric motor comprising in combination with selective switches and circuits for controlling the operation of the motor, a plurality of screws, one of which is continuously operative during the entire control period, and which has a setting arm operatively connected with means adapted to engage the threads of the screw, a driving connection adapted to be set in operation at a limit of movement of said means, a normally open switch adapted to be closed at said same limit of movement, said switch for controlling a subsequent cycle of rotation of said motor, a normally closed switch associated with said normally open switch for breaking the circuit at the end of the prior cycle of rotation, said driving connection for driving another screw provided with a setting arm operatively connected with means for engaging the threads of its respective screw, and another normally closed switch adapted to be opened at a limit of movement of said last named means relative to said last named screw for breaking the high speed circuit and stopping said motor.

2. Mechanical means for automatically controlling a plural speed electric motor comprising in combination with selective switches and circuits for controlling the operation of the motor, a plurality of screws, one of which is continuously operative during the entire control period, and which has a setting arm operatively connected with means adapted to engage the threads of the screw, a driving connection adapted to be set in operation at a limit of movement of said means, a normally open switch adapted to be closed at said same limit of movement, said switch for controlling a subsequent cycle of rotation of said motor, a normally closed switch associated with said normally open switch for breaking the circuit at or near the end of the prior cycle of rotation, said driving connection for driving another screw provided with a setting arm operatively connected with means for engaging the threads of its respective screw, and another normally closed switch adapted to be opened at a limit of movement of said last named means relative to said last named screw for breaking the circuit to said motor, and graduated scales arranged with such relation to said setting arms as to determine the proper settings thereof.

3. Mechanical means for automatically controlling a plural speed electric motor comprising in combination with selective switches and circuits for controlling the operation of the motor, a plurality of screws, one of which is continuously operative during the entire control period, and which has a setting arm operatively connected with means adapted to engage the threads of the screw, a driving connection adapted to be set in operation at a limit of movement of said means, a normally open switch adapted to be closed at said same limit of movement, said switch for controlling a subsequent cycle of rotation of said motor, a normally closed switch associated with said normally open switch for breaking the circuit at the end of the prior cycle of rotation, said driving connection for driving another screw provided with a setting arm operatively connected with means for engaging the threads of its respective screw, and another normally closed switch adapted to be opened at a limit of movement of said last named means relative to said last named screw for breaking the circuit to said motor, and driving connections from said motor to said mechanical means.

4. In combination with a machine and a plural speed electric motor for driving same, a mechanical control for said motor comprising means operatively connected with said machine, said control provided with means for controlling the operation of the machine at a predetermined rate of operation for a predetermined interval and for automatically changing the rate of operation of said machine to a predetermined rate of operation for a subsequent interval, said mechanical control comprising a plurality of screws, the rotation of one of which controls the rotation of another.

5. In combination with a machine and a plural speed electric motor for driving same, a mechanical control for said motor comprising means operatively connected with said machine, said control provided with means for controlling the operation of the machine at a predetermined rate of operation for a predetermined interval and for automatically changing the rate of operation of said machine to a predetermined rate of operation for a subsequent interval, said mechanical control comprising a plurality of screws, the rotation of one of which controls the rotation of another, the threads on said screws being indicative of units of operative control.

6. In combination with a machine and a plural speed electric motor for driving said machine, a mechanically operative control for said motor comprising means for controlling the operation of the machine at a predetermined rate of operation for a predetermined interval and for automatically changing the rate of operation to a different speed for a subsequent interval, said mechanically operative control comprising a plurality of screws with setting means one for each screw adapted to engage predetermined portions of said screws.

7. In combination with a machine and a plural speed electric motor for driving said machine, a mechanically operative control for said motor comprising means for controlling the operation of the machine at a predetermined rate of operation for a predetermined interval and for automatically changing the rate of operation to a different speed for a subsequent interval, said mechanically operative control comprising a plurality of screws with setting means one for each screw adapted to engage predetermined portions of said screws, and one of said screws being continuously operative and provided with means which at a limit of movement of its respective setting means provides the power to operate another screw.

8. In combination with a machine and a plural speed electric motor for driving said machine, a mechanically operative control for said motor comprising means for controlling the operation of the machine at a predetermined rate of operation for a predetermined interval and for automatically changing the rate of operation to a different speed for a subsequent interval, said mechanically operative control comprising a plurality of screws with setting means one for each screw adapted to engage predetermined portions of said screws, and a casing enclosing said mechanically operative control having indicia so arranged as to enable an operator to set said setting means in predetermined position to control the intervals of operation at different motor speeds.

9. In combination with a machine and a plural speed electric motor for driving said machine, a mechanically operative control for said motor comprising means for controlling the operation of the machine at a predetermined rate of operation for a predetermined interval and for automatically changing the rate of operation to a different speed for a subsequent interval, said mechanically operative control comprising a plurality of screws with setting means one for each screw adapted to engage predetermined portions of said screws, and said screws having threads set so as to determine units of intervals of operation.

FRANK X. LAUTERBUR.
EDWARD J. LAUTERBUR.